(12) United States Patent
Tailliet

(10) Patent No.: US 9,489,334 B2
(45) Date of Patent: Nov. 8, 2016

(54) METHOD FOR MANAGING THE OPERATION OF A CIRCUIT CONNECTED TO A TWO-WIRE BUS

(71) Applicant: STMicroelectronics (Rousset) SAS, Rousset (FR)

(72) Inventor: Francois Tailliet, Fuveau (FR)

(73) Assignee: STMicroelectronics (Rousset) SAS, Rousset (FR)

(*) Notice: Subject to any disclaimer, the term of this patent is extended or adjusted under 35 U.S.C. 154(b) by 483 days.

(21) Appl. No.: 14/042,344

(22) Filed: Sep. 30, 2013

(65) Prior Publication Data

US 2014/0095750 A1 Apr. 3, 2014

(30) Foreign Application Priority Data

Oct. 2, 2012 (FR) ...................... 12 59314

(51) Int. Cl.
*G06F 13/42* (2006.01)
*G06F 13/40* (2006.01)

(52) U.S. Cl.
CPC ....... *G06F 13/4282* (2013.01); *G06F 13/4077* (2013.01)

(58) Field of Classification Search
CPC .................. G06F 9/02; G06F 11/00
USPC .................. 710/105, 300–306; 713/300–344
See application file for complete search history.

(56) References Cited

U.S. PATENT DOCUMENTS

| | | | |
|---|---|---|---|
| 4,719,458 A | 1/1988 | Miesterfeld et al. | |
| 5,715,407 A | 2/1998 | Barth et al. | |
| 5,754,799 A | 5/1998 | Hiles | |
| 2006/0069905 A1* | 3/2006 | Moriwaki | H04B 10/40 713/1 |
| 2007/0112990 A1 | 5/2007 | Hayashita | |
| 2009/0157929 A1* | 6/2009 | Pigott | G06F 13/4291 710/110 |
| 2011/0133771 A1* | 6/2011 | Anderson | H03K 5/04 326/30 |

\* cited by examiner

*Primary Examiner* — Tim T Vo
*Assistant Examiner* — Kim T. Huynh
(74) *Attorney, Agent, or Firm* — Slater Matsil, LLP

(57) ABSTRACT

A method is provided for managing the operation of a circuit operating in a slave mode. The circuit is connected to a bus having at least two of wires and a priority logic level. The slave circuit imposes the priority logic level on a first wire of the bus. While imposing, the slave circuit detects a possible conflict on the first wire resulting from a forcing, external to the slave circuit, of the first wire to another logic level. Upon detecting a conflict, the slave circuit is placed in a state stopping the sending by the circuit of any data over the bus while leaving the circuit listening to the bus.

24 Claims, 7 Drawing Sheets

METHOD FOR MANAGING THE OPERATION OF A CIRCUIT CONNECTED TO A TWO-WIRE BUS

This application claims priority to French Patent Application No. 1259314 which was filed Oct. 2, 2012 and is incorporated herein by reference.

TECHNICAL FIELD

Embodiments of the invention relate to the management of the operation of a circuit connected to a bus having at least two wires.

BACKGROUND

The $I^2C$ protocol is a communication protocol of the priority logic state type. The $I^2C$ bus makes it possible for highly diverse electronic modules to communicate with one another using only two wires or lines. One wire is for a data signal (SDA: "Serial Data") and one wire is for a clock signal (SCL: "Serial Clock"). Although the bus also comprises a wire for a ground signal and a power supply wire, it is nevertheless referred to as a two-wire bus. The interfaces of the modules connected to the SDA wire and to the SCL wire are of collector or open drain type imposing a priority logic state on the corresponding wire. Generally, there is also provided, conventionally and as is known per se, a pull-up resistor connected between the power supply voltage Vdd, for example 5 volts, and the $I^2C$ bus.

In such a configuration, the priority logic state on the $I^2C$ bus is a logic "0". The pull-up resistor(s) allow the data line of the bus or the clock line to be at the high logic level ("1" logic level) if all the outputs (drains) of the interfaces are also at the 1 level. On the other hand, if at least one output of an output stage imposes a low level on the line of the bus (the corresponding transistor is passing), this will lead to a low level ("0" logic level) on the corresponding line, regardless of the levels of the drains of the other output stages.

The characteristics of the $I^2C$ bus and of the $I^2C$ protocol are well known to the person skilled in the art. For all useful purposes the person skilled in the art will be able to refer in particular to the document published by the company NXP Semiconductors, available notably on the Internet, and entitled "UM10204, $I^2C$-bus specification and user manual", Rev. 4-13 February 2012.

An $I^2C$ bus can link a master circuit or module to one or more slave circuits. There are also $I^2C$ buses that connect two master circuits to a plurality of slave circuits. In this case, one of the master circuits must behave as a slave circuit.

The master and the slaves exchange data according to transactions defined in the $I^2C$ protocol.

In a normal situation, on buses with at least two wires with priority logic level, there is no conflict on the lines of the bus. In practice, when a slave circuit wants to impose the priority logic level on the bus (the "0" level), the transistor of the interface pulls the corresponding line to the ground and the transistors of the other slave circuits are blocked. Because of this, given the presence of the pull-up resistors, a predetermined voltage is then established on the bus, typically of the order of 250 millivolts, which is perfectly acceptable for the slave circuit.

However, in certain cases, a conflict may occur on one of the lines of the bus.

Such is the case when the line is forced, externally to the slave circuit which is in the process of wanting to impose the priority logic level on a line of the bus, to the other logic level (in this case the "1" logic level).

Such a case can occur, for example, when a master circuit manages an $I^2C$ bus to which hot plug-in removable peripheral devices can be connected. Such is the case, for example, of a printer equipped with ink cartridges each having an $I^2C$ micromodule with four contacts (Vdd, ground, SDA and SCL). There is then a possibility of short-circuiting the SDA line and/or the SCL line to the power supply voltage Vdd on an incorrect insertion. In such a case, the pull-up resistor of the line concerned is then short-circuited and the voltage on the line concerned becomes very great as does the current which will circulate in the transistor of the slave circuit which was trying to impose the priority logic level (logic "0").

A conflict may also occur when the slave circuit is subject to significant noise because of its environment.

As an indication, in the case of conflict, the short-circuit current can exceed 200 milliamperes at 5 volts. This can then result in a rapid destruction of the circuit by melting of the solder joints and/or of the contacts or else a slower destruction of the circuit by electro-migration or even more or less rapid damage to the circuit by overheating or even a blocking of the circuit because of the noise generated on the ground power supply.

Also, these risks have become particularly significant with the introduction of a particular mode of the $I^2C$ bus which is the mode called "fast-mode plus". This is because this mode imposes output stages with a much lower impedance than that required for the conventional modes, which can result in very much higher short-circuit currents.

SUMMARY

Embodiments of the invention relate to the management of the operation of a circuit connected to a bus having at least two wires, for example an $I^2C$ bus or an SM bus, and configured to operate at least in slave mode and exchange data over the bus, for example, according to the $I^2C$ protocol or the SM bus protocol. Particular embodiments relate to the protection of such circuits in case of conflict on one of the wires of the bus, for example, the data wire or the clock wire.

Specific embodiments of the invention apply to electrically-erasable and programmable read-only memories (EEPROM memories) intended to be connected to such a bus. As will be seen, other types of devices can also utilize concepts of the invention.

Embodiments provide a satisfactory and industrially acceptable solution to improve the protection of a circuit connected to a bus with priority logic level, such as, for example, the $I^2C$ or SM bus, against the risks of conflicts on this bus. According to one implementation and embodiment, a solution is proposed to address this need which is simple to implement.

According to another implementation and embodiment, a solution is proposed for protecting against the conflicts and which also makes it possible to avoid, for example in the case of EEPROM memory, reprogramming operations which would lead to erroneous programmed data.

According to one aspect, there is proposed a method for managing the operation of a circuit connected to a bus having at least two wires and a priority logic level (typically the "0" logic level), the circuit being configured to operate at least in slave mode and exchange data over the bus;

A circuit configured to operate at least in slave mode can be a slave circuit proper or else a master circuit capable, for example on a multi-master bus, of behaving in some cases as a slave circuit;

According to a general feature of this aspect, the method comprises, when the slave circuit imposes the priority logic level on one of the lines of the bus, whether it is a data line or a clock line, a detection within the slave circuit of a possible conflict on this line resulting from a forcing, external to the slave circuit, of this line to the other logic level (typically the "1" logic level), and in the case of a detected conflict, placement of the slave circuit in a state stopping the sending by the slave circuit of any data over the bus while leaving the slave circuit listening to the bus.

The placement in this state will have the result not only of blocking the transistor of the output stage (or interface) of the circuit used to impose the priority logic level, but also of placing the circuit in a standby state, which will therefore stop the overheating of the circuit and therefore protect it against the damaging consequences which can result therefrom. Moreover, the fact that the circuit remains listening to the bus in this way makes it possible to allow it to subsequently receive a possible new command to then return it to a normal state of operation when the conflict has ceased.

According to an implementation in which the circuit is connected to an I2C bus or to an SM bus, the placement of the slave circuit in the state comprises a generation within the slave circuit of an internal signal that can be interpreted by the slave circuit as representative of the reception of a STOP condition of the I2C protocol or of the SM bus protocol.

The I²C or SM bus protocol, a transaction generally begins with a START condition and ends with a STOP condition. A START condition is defined by a high-to-low transition on the data line when the clock line is in the high state. A STOP condition is defined by a low-to-high transition on the data line when the clock line is in the high state.

Generally, when a circuit receives a STOP condition from the bus, it internally generates a deselect signal which has the effect of interrupting any communication between the bus and this circuit and of placing it in a state in which it will await the reception of a possible new START condition.

Also, the internal signal generated on the detection of a conflict will be interpreted by the circuit as representative of the reception of a STOP condition, which makes it possible, by using an existing condition of the bus, to simply place the circuit in its standby state and listen to the bus with the beneficial consequences indicated hereinabove.

Moreover, some slave circuits are configured to execute at least one particular processing after the reception of a STOP condition. Such is the case in particular when the slave circuit comprises a memory of the EEPROM type. In practice, in this case, the particular processing is a programming of the memory with the data received prior to the reception of the STOP condition. Now, in the case of a conflict, the data which may possibly have been received by the memory before the generation of the internal signal interpreted as being the reception of a STOP condition may possibly be corrupted data. In this case, it is particularly advantageous to inhibit the execution of this particular processing after the generation of the internal signal.

According to a variant, the detection comprises a comparison of the voltage of the line on which the slave circuit imposes the priority logic level with a reference voltage, and a conflict is detected when the voltage exceeds the reference voltage at least for a predetermined duration.

This variant thus implements a timer.

This variant applies whether the conflict occurs on a data line or on a clock line of the bus.

According to another variant, applicable only when the slave circuit imposes the priority logic level on a data line of the bus, the detection comprises a comparison of the voltage of the data line with a reference voltage and a conflict is detected when the voltage exceeds the reference voltage on the rising edge of the clock signal following the falling edge on which the slave circuit imposed the priority logic level on the data line.

A slave circuit is, as indicated hereinabove, capable of detecting the reception of a STOP condition emanating from the bus. Also, in response to the detection of such a STOP condition, the slave circuit delivers a deselect signal. Also, according to one implementation, one way of interpreting the internal signal generated on the detection of a conflict as being representative of the reception of a STOP condition may consist in delivering also, within the circuit, the deselect signal in response to the generation of this internal signal.

To further limit the overheating of the component between the moment when the conflict occurs and the moment when it is detected, provision is advantageously made for the circuit to also comprise a limiting of the voltage applied to the control electrode of the transistor via which the slave circuit imposes the priority logic level.

According to another aspect, there is proposed a circuit, comprising an interface configured to be connected at least in slave mode to a bus having at least two wires and a priority logic level and exchange data over the bus.

According to a general feature of this other aspect, the circuit comprises first circuitry having a first state in which the circuitry is configured to impose the priority logic level on one of the wires or lines of the bus. A detector is configured to detect a possible conflict on this line resulting, when the first circuitry are in their first state, from a forcing, external to the slave circuit, of this line to the other logic level. Second circuitry, e.g., control circuitry, is configured to, in the case of a detected conflict, place the slave circuit in a state stopping the sending by the slave circuit of any data over the bus while leaving the slave circuit listening to the bus.

According to one embodiment, the interface is configured to be connected to an I2C bus or to an SM bus and the control circuitry comprises signal generation circuitry configured to, in the case of a detected conflict, generate an internal signal that can be interpreted by the slave circuit as representative of the reception of a STOP condition of the I2C protocol or of the SM bus protocol.

According to one embodiment, the circuit also comprises processing circuitry configured to execute at least one particular processing after the reception of a STOP condition and inhibition circuitry configured to inhibit the execution of the at least one particular processing after the generation of the internal signal.

According to one embodiment, the circuit is a slave circuit comprising a memory of the EEPROM type, and the processing circuitry comprises memory programming circuitry.

According to a variant, the detector comprise a comparator configured to perform a comparison of the voltage of the line on which the circuit imposes the priority logic level with a reference voltage and a timer containing a duration information item. The second circuitry is connected to the output of the comparator and to the output of the timer, and is configured to place the circuit in the state when the voltage exceeds the reference voltage at least for a duration equal to the duration information item.

According to another variant, the first circuitry is configured to impose, in its first state, the priority logic level on a data line of the bus on a falling edge of the clock signal. The detector comprises a comparator configured to perform a comparison of the voltage of the data line with a reference voltage. Third circuitry is configured to detect the rising edge of the clock signal following the falling edge. The second circuitry is connected to the output of the comparator and to the output of the third circuitry and is configured to place the circuit in the state when the voltage exceeds the reference voltage on the rising edge of the clock signal following the falling edge.

According to one embodiment, the interface comprises a block for detecting a STOP condition and configured to deliver a deselect signal in response to the detection of a STOP condition. The second circuitry comprises a logic gate connected to the output of the signal generation circuitry and to the output of the detection block and configured to deliver the deselect signal in response to the internal signal.

According to one embodiment, the first circuitry comprises a transistor and the circuit comprises circuitry for limiting the voltage applied to the control electrode of this transistor.

BRIEF DESCRIPTION OF THE DRAWINGS

Other advantages and features of the invention will become apparent on examining the detailed description of implementations and embodiments, which are in no way limiting, and the appended drawings in which.

DETAILED DESCRIPTION OF ILLUSTRATIVE EMBODIMENTS

Figure 1:
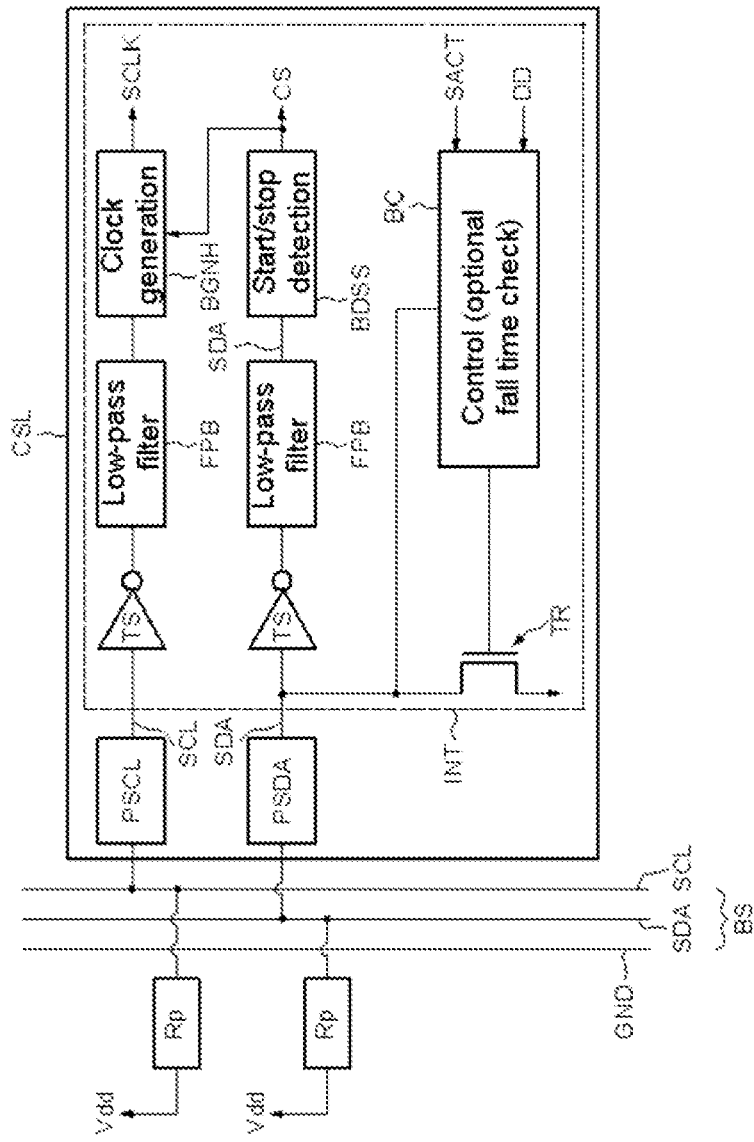
FIG. 1 illustrates, schematically, an embodiment of a slave circuit according to the prior art, and FIGS. 2 to 8 schematically illustrate different implementations and embodiments relative to a method and a slave circuit according to the invention.

In FIG. 1, the reference CSL designates a slave circuit or module connected to a bus BS conforming to the I²C specification. The bus BS here comprises, conventionally, a data line SDA, a clock line SCL and a ground line GND. Moreover, as indicated hereinabove, pull-up resistors Rp are connected between the data line and the power supply Vdd and between the clock line and the power supply Vdd.

The circuit CSL, for example an integrated circuit, comprises two contact bumps, or "pads", PSDA and PSCL, respectively connected to the data line SDA and the clock line SCL.

The component CSL also comprises an I²C interface, referenced INT, and comprising a first channel connected to the PSCL pad and a second channel connected to the PSDA pad.

Through a misuse of language, the reference SCL also designates the clock signal internal to the component CSL derived from the clock line SCL and received at the pad PSCL.

Similarly, through a misuse of language, the reference SDA also designates the data signal internal to the component CSL and derived from or intended for the data line SDA and received or transmitted at the pad PSDA.

The first channel connected to the pad PSCL comprises, at the input, an inverting Schmitt trigger TS intended to re-shape the signal SCL followed by a low-pass filter FPB intended to eliminate as far as possible any noise. The low-pass filter FPB is followed by a clock generation block BGNH which delivers an internal clock signal SCLK.

The second channel, connected to the pad PSDA, also comprises, at the input, an inverting Schmitt trigger TS followed by a low-pass filter FPB followed by a block BDSS intended to detect the START and STOP conditions received from the bus.

This second processing channel may comprise one or more inverters so that the signals SDA delivered at the pad PSDA and upstream of the block BDSS are not mutually inverted.

The block BDSS conventionally delivers a select/deselect signal CS. Thus, when the logic signal CS is, for example, in the high state, the circuit is selected whereas, when the logic signal CS is in the low state $\overline{CS}$, this is a deselect signal deselecting the circuit from the bus. In other words, when the processing unit of the circuit CSL receives a deselect signal, it places the circuit in a standby state, stopping any sending of data over the bus. Nevertheless, in this state, the circuit remains listening to the bus and awaits the possible reception of a new START condition.

Here again, one or more inverters may be incorporated in the low-pass filter and/or in the block BGNH of the first processing channel so that, when the component is selected (signal CS in the high state), the signal SCLK is not inverted relative to the signal SCL. It should also be noted that, when the component is deselected (signal CS in the low state), the block BGNH blocks the internal clock signal SCLK.

In addition to the means which have just been described, the interface INT conventionally comprises a transistor TR, here an NMOS transistor, having its source connected to the ground and its drain connected to the contact PSDA. When the circuit CSL wants to transmit a "0" (priority logic level) over the bus BS, the transistor TR is controlled on its gate so as to be passing. The control applies from an activation signal SACT and from the data signal DD via an optional control block BC making it possible to control the fall time of the voltage on the line SDA.

An example of the appearance of a conflict on the line SDA will now be illustrated with reference to FIG. 2.

Figure 2:
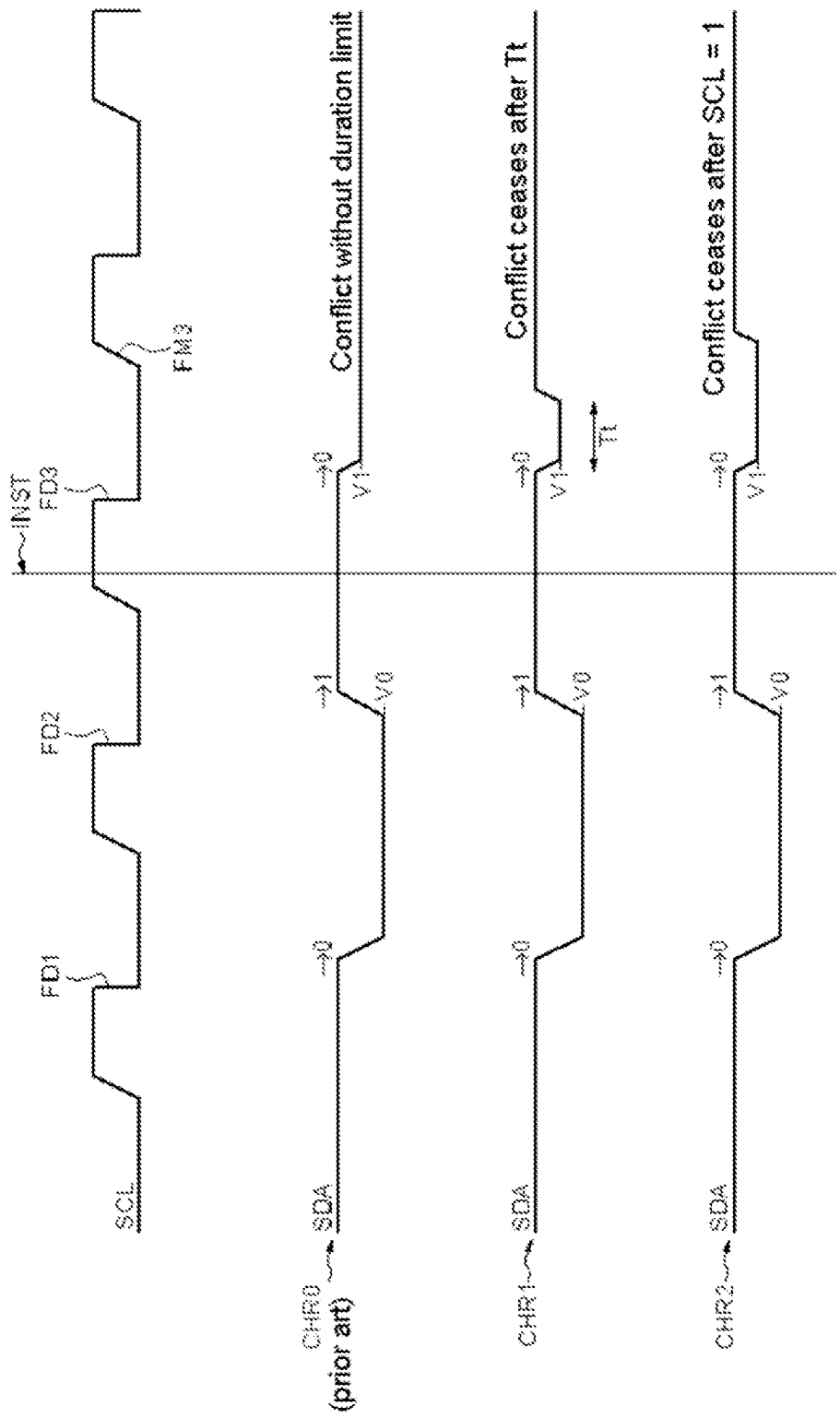

The timer diagram CHRO in the top part of FIG. 2 illustrates the trend over time of the clock signal SCL.

It is assumed in this example that the circuit CSL delivers, over the data line SDA, in succession, the data 0, 1, 0, 0 (SDA signal).

These data are sampled conventionally on the falling edges FD1, FD2 and FD3 of the clock signal SCL.

It is also assumed that, from the instant INST, there is a forcing, external to the circuit CSL, of the line SDA. Such is the case for example if the line SDA is intentionally or accidentally short-circuited to the voltage Vdd or even raised to the voltage Vdd by a component connected to the bus and having a very low-ohmic access path compared to the pull-up resistors RP.

It is then seen that, instead of the voltage level of the line SDA (voltage level of the signal SDA) falling to the level V0 (typically 400 millivolts at most) as a function of the value chosen for the pull-up resistor RP, the voltage level of the line SDA falls to a level V1 when, on the falling edge FD3, the component CSL pulls the line SDA to 0. Also, because of the conflict, the level V1 is much higher than the level V0 and can, depending on the case, reach values ranging up to the power supply voltage.

This may then result in a significant short-circuit current flowing in the transistor TR that might, for example, lead to rapid destruction of the circuit through melting of solder, contact or interconnection, or even damage to the integrated circuit, more or less rapidly, through overheating. As an indication, in some cases, the short-circuit current can exceed 200 milliamperes at 5 volts.

Also, in the prior art, not only is the conflict not detected but it can continue without any time limitation, which is extremely prejudicial.

On the contrary, according to one implementation of the invention, when the slave circuit imposes the priority logic level on one of the lines of the bus, in this case the data line SDA, the possible conflict is detected within the slave circuit, and, in the case of a detected conflict, an internal signal is generated within the slave circuit that can be interpreted by the slave circuit as representative of the reception of a STOP condition of the I$^2$C protocol.

Consequently, the slave circuit is deselected from the bus and is set at least to a standby state in which any sending of data over the bus is stopped and in which it remains listening to the bus to await the reception of a new START condition. Consequently, the transistor TR is blocked, the line SDA goes back up to the "1" logic level and the conflict ceases.

As illustrated in FIG. 2, a number of variants can be envisaged.

Thus, it will be seen in the timing diagram CHR1 that, in a first variant, a timer can be implemented that has a duration Tt, at the end of which the conflict ceases.

According to another variant, illustrated in the timing diagram CHR2, the conflict ceases at the rising edge FM3 of the clock signal SCL following the falling edge FD3 on which the slave circuit imposed the priority logic level on the data line SDA.

Figure 3:
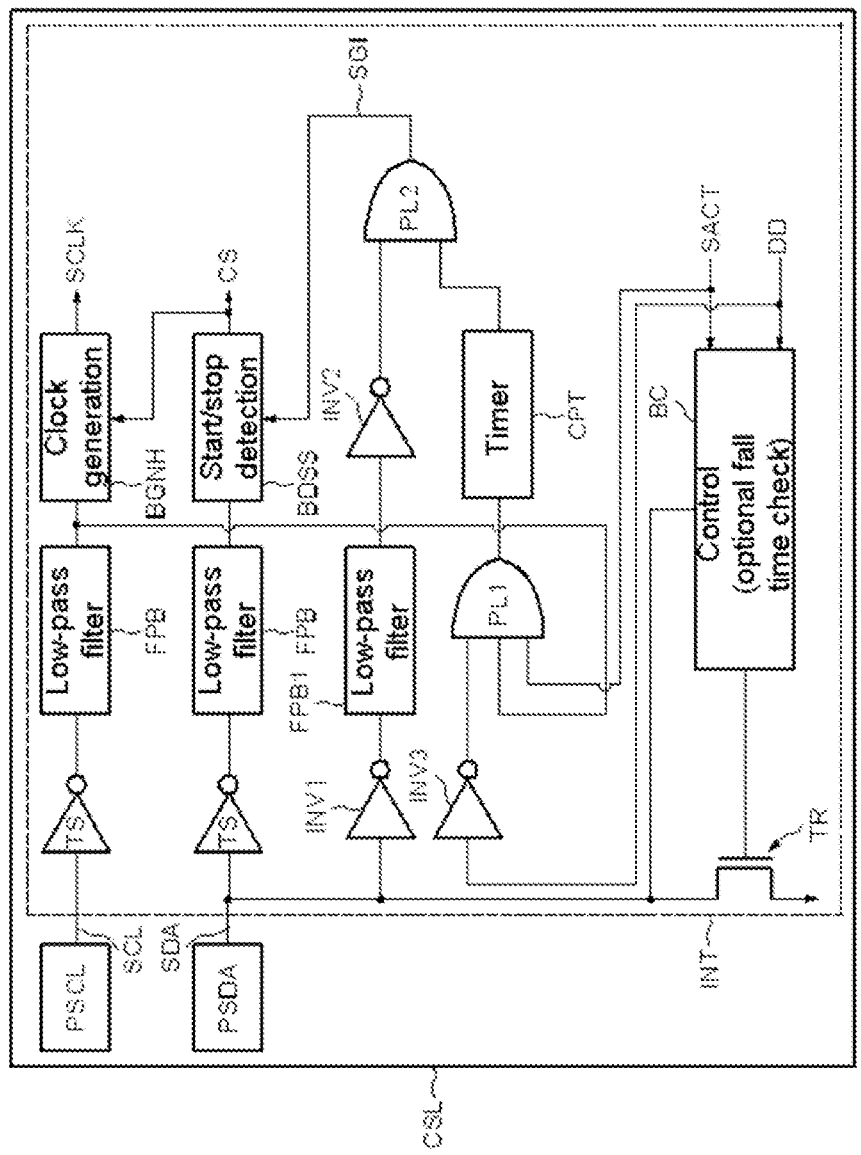

Reference is now more particularly made to FIG. 3 to describe the variant of the invention implementing the timer. This timer is implemented for example conventionally by means of a time counter CPT, incremented from the zero value to the duration information item Tt and delivering, when this duration information item is reached, the "1" logic value.

Moreover, as indicated hereinabove, there is first of all a detection within the slave circuit of the possible conflict on the data line. This detection comprises a comparison of the voltage of the line with a reference voltage. This comparison is performed in comparison circuitry which here comprise an inverter INV1, unbalanced at the MOS N and P transistors. More specifically, it will be possible to choose an inverter INV1 comprising an MOS N of large size and an MOS P of small size. The switchover threshold of the inverter determines the reference voltage. It will be possible to choose a reference voltage greater than 400 millivolts, for example 850 millivolts, so as to avoid untimely detections.

The comparison circuitry also preferably comprise a low-pass filter FPB1 connected to the output of the inverter INV1. This low-pass filter, for example a resistive-capacitive filter, makes it possible to eliminate the false detections resulting for example from noise peaks.

When the voltage of the line SDA exceeds the reference value, the output of the inverter INV1 switches over to 0.

Because of this, another inverter INV2 is placed at the output of the low-pass filter FPB1 to deliver a logic "1" when the voltage of the line SDA exceeds the reference voltage.

Moreover, two other inverters INV3, INV4, as well as an AND logic gate, referenced PL1, make it possible to reset the time counter CPT.

More specifically, since the conflict must be detected when the slave circuit CSL wants to impose the priority logic level, the inverter INV3 inverts the data DD delivered by the slave circuit. This inverter INV3 is connected to a first input of the logic gate PL1.

Moreover, since the data is sampled at the output on the falling edge of the clock signal SCL, the second input of the gate PL1 receives as input the inverted clock signal SCL, preferentially after the low-pass filter FPB and before the clock generation block BGNH. It is assumed in this respect here that the low-pass filter does not once again invert the inverted signal SCL delivered by the Schmitt trigger.

Finally, the third input PL1 receives the activation control signal SACT, which takes the logic 1 value when the slave circuit wants to deliver a data item DD over the bus.

Consequently, when the three inputs of the logic gate PL1 are at "1", the output of this gate PL1 is at 1, initializing the timer CPT.

The value Tt of the timer is, for example, taken to be equal to 500 nanoseconds.

The output of the inverter INV2 and the output of the time counter CPT are linked to the two inputs of an AND logic gate, referenced PL2, here forming signal generation circuitry suitable for generating an internal signal SGI (logic signal in the 1 state) when the voltage on the line SDA exceeds the reference voltage at least for the duration equal to the duration information item contained in the time counter CPT.

Also, this signal SGI will be interpreted by the processing unit of the circuit CSL as being representative of the reception of a STOP condition of the I$^2$C protocol.

In this respect, the signal SGI is represented schematically in FIG. 3 as driving the block BDSS for detecting START and STOP conditions.

Figure 4:
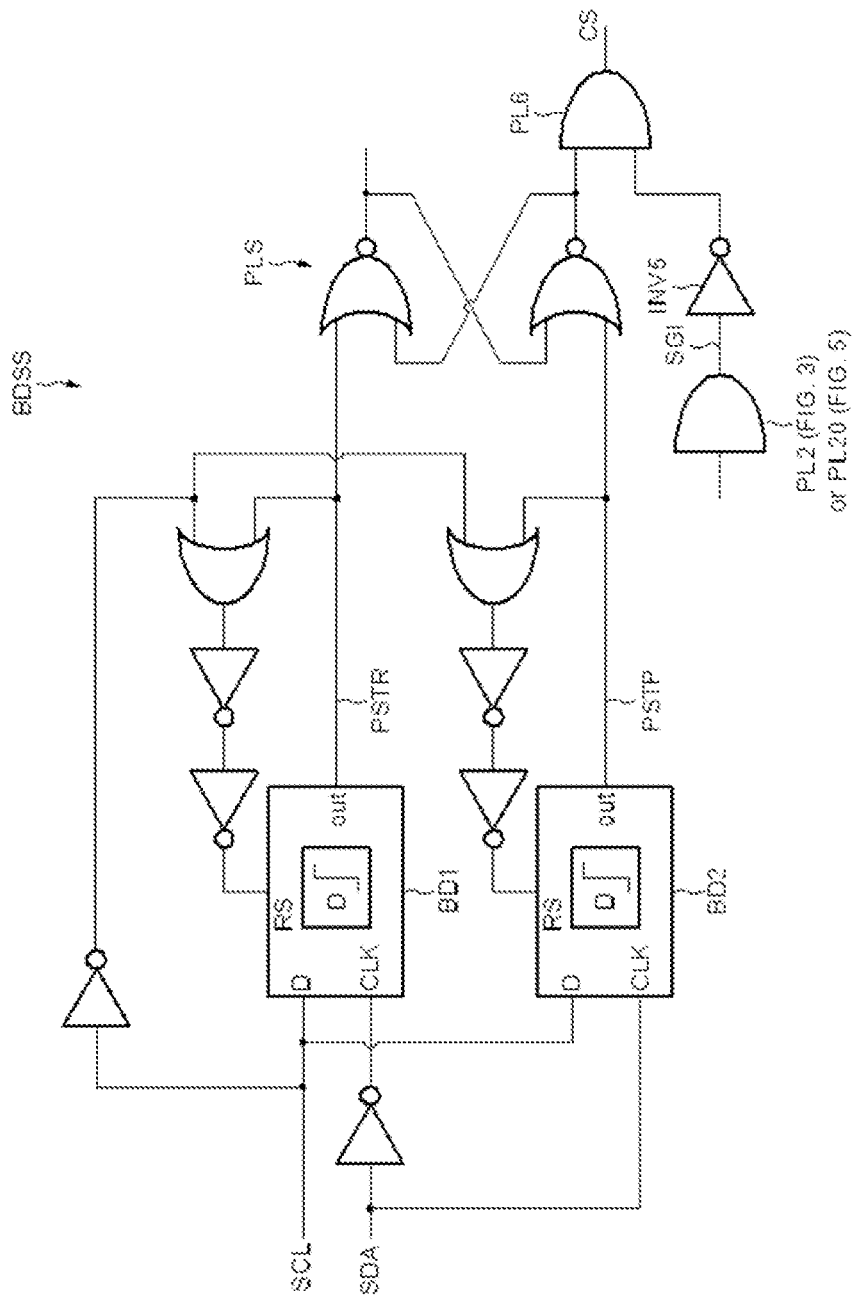

To produce this interpretation, one solution consists, as illustrated in FIG. 4, in slightly modifying the structure of the block BDSS for detecting START and STOP conditions.

More specifically, conventionally, this block BDSS is architectured around two D flip-flops, referenced BD1 and BD2, and respectively receiving on their data input the signal SCL, and on their clock input the inverted data signal SDA and the signal SDA.

The output of the flip-flop BD1 delivers a pulse PSTR on the reception of a START condition, whereas the flip-flop BD2 delivers a pulse PSTP on the reception of a STOP condition.

Two NOR gates, PLS, cross-connected, and forming a flip-flop, respectively receive the pulses PSTR and PSTP and usually deliver the select/deselect signal CS.

The modification according to one aspect of the invention consists, for example, in connecting to the output of one of the NOR gates, an AND logic gate, referenced PL6, the other input of which is connected to the output of the logic gate PL2 (FIG. 3) via an inverter INV5.

The gates PL2 and PL6 form part of second circuitry, e.g., a control circuit, configured to place the circuit CSL in its standby state with listening to the bus, in the presence of a conflict detected on the bus.

In practice, as indicated hereinabove, the presence of a detected conflict is reflected by a signal SGI, at the output of the gate PL2, having the "1" logic value and consequently, after inversion in the inverter INV5, by a logic signal having the "0" logic value at the input of the gate PL6.

Consequently, the logic gate PL6 then delivers the deselect signal CS having the "0" logic value, which makes it possible to deselect the slave circuit CSL.

In the absence of conflict (second input of the gate PL6 at the 1 level), this addition is transparent with respect to the select/deselect signal delivered by the NOR gate PLS.

Figure 5:
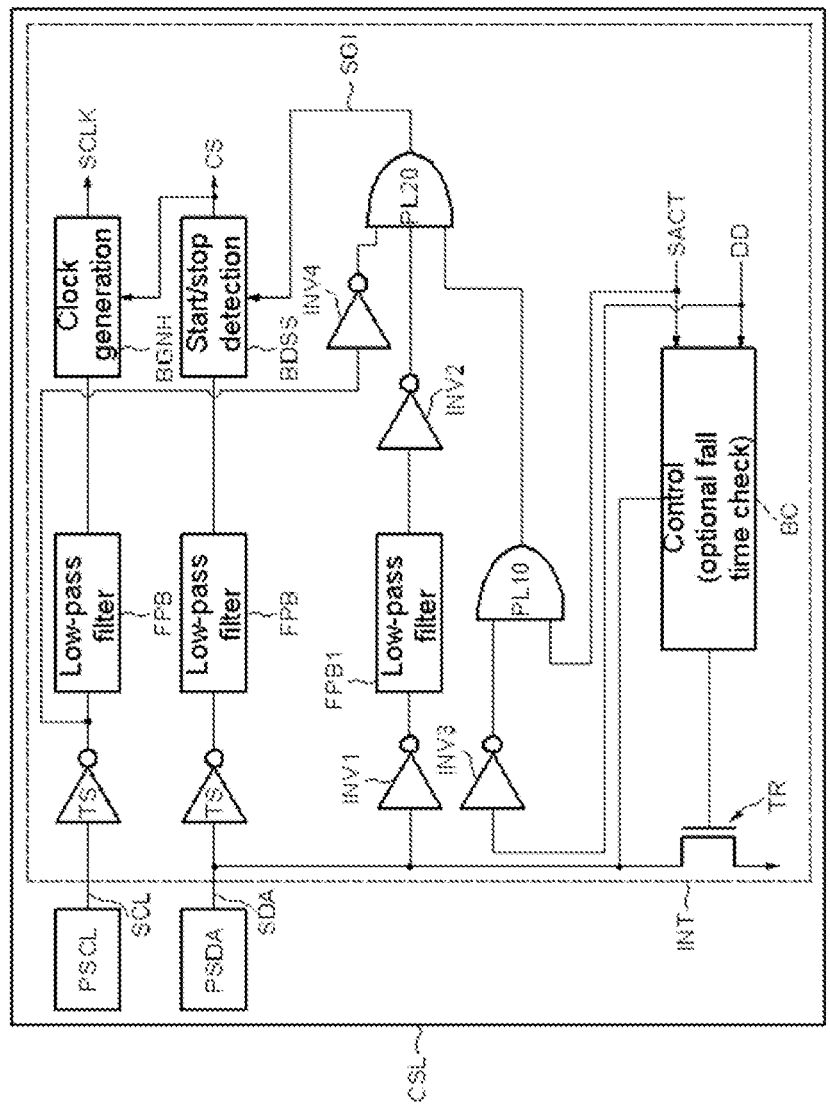

Reference is now particularly made to FIG. 5 to illustrate an exemplary implementation of the variant of the invention providing for a cessation of the conflict at the rising edge of the clock following the falling edge on which the circuit CSL imposed the priority logic level on the line of the bus, in this case the line SDA.

Only the differences from FIG. 3 will now be described.

Here, the logic gate PL20 is an AND gate with three inputs which receive, in the same way as the logic gate PL2 of FIG. 3, the output of the inverter INV2.

Here, the logic gate PL10 is an AND logic gate with two inputs, which receives, on the one hand, the output of the inverter INV3 and, on the other hand, the activation signal SACT. The output of the logic gate PL10 is connected to another input of the logic gate PL20. Finally, the first input of the logic gate PL20 is connected to the output of the inverting Schmitt trigger TS via an inverter INV4, so that this input of the logic gate PL20 receives the logic signal SCL. The three inputs of the logic gate PL20 are at "1" (conflict detected) when the output of the logic gate PL10 is at "1" (imposition of a "0" logic level on the data line SDA), when the output of the inverter INV2 is at "1" (detection of the reference voltage being exceeded) and when the clock signal SCL exhibits a rising edge.

Consequently, the conflict is detected and ceases at the rising edge FM3 of the clock signal SCL (FIG. 2) following the falling edge FD3.

Although the variants of the invention which have just been explained make it possible to better protect the slave circuit on the detection of a conflict, it appears that, when a conflict occurs, the circuit is not immediately deselected, and the current and the power dissipated by the output transistor TR of the circuit SCL are not limited, which can then, in certain cases, lead to a risk of rapid destruction, before the expiry of the timer or the next rising edge of the clock signal.

Also, there is an interest in limiting this current by limiting, for example, the maximum gate voltage that the transistor TR can receive. This is of particular interest notably when the I²C bus is operating in a so-called "fast mode plus" mode.

Figure 6:
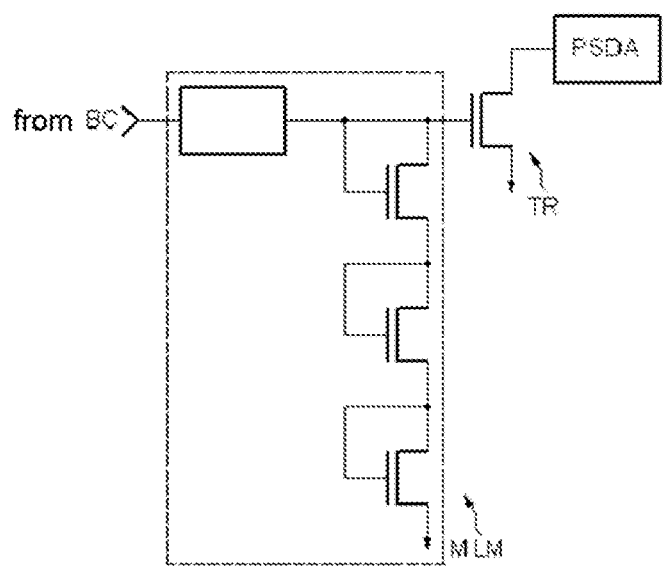

An example of circuitry for limiting the gate voltage of the transistor TR is illustrated in FIG. 6. It will be seen that this limiting circuitry MLM is connected between the optional control block BC and the gate of the transistor TR. Here, the circuitry comprises a resistor associated with three transistors mounted as diodes and connected between the resistor, the gate of the transistor TR and the ground.

Figure 7:
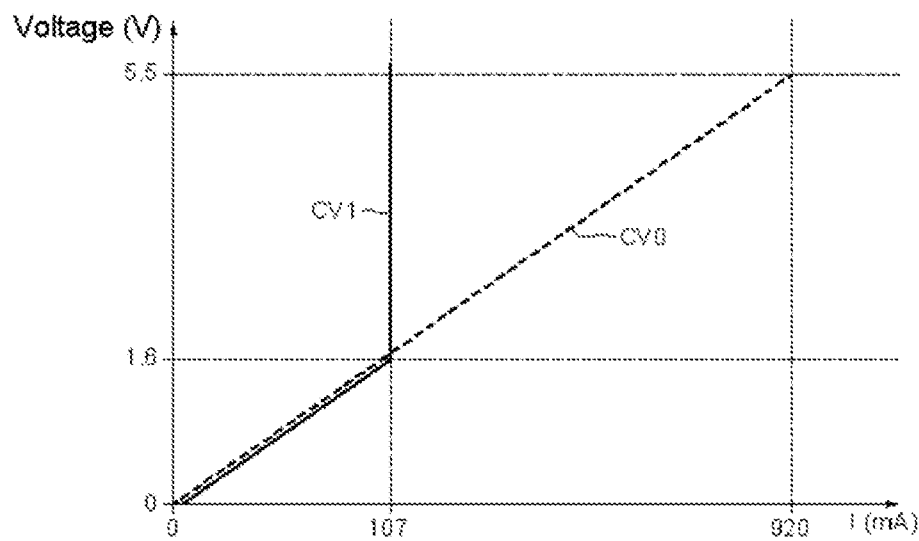
Figure 8:
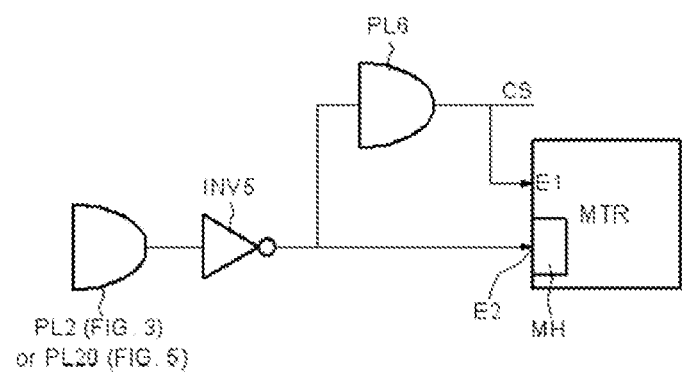

It will then be seen in FIG. 7, which illustrates a numerical example, that when the interface INT is short-circuited at 5.5 volts, the saturation current of the transistor can reach 900 milliamperes, which gives a dissipated power of the order of 5 watts.

On the other hand, with a limiting of the gate voltage of the transistor TR to 2.4 volts and for a threshold voltage of TR equal to 0.8 volt, there is a difference between the gate voltage and the threshold voltage of the transistor equal to 1.6 volt, which provides a saturation current of the order of 107 milliamperes with a dissipated power equal this time to 0.59 watt.

The current and the maximum power dissipated by the interface have therefore been divided by 10 as long as the deselection of the slave circuit CSL has not taken place.

In certain cases, the slave circuit comprises processing circuitry MTR configured to execute at least one particular processing after the reception of a STOP condition. Such is the case for example when the slave circuit comprises a memory of the EEPROM type, the particular processing then being the programming of the memory with the data received before the reception of the STOP condition. Provision is advantageously made in this case, in order to avoid writing data which could possibly be corrupted, for the circuit to comprise inhibition circuitry MH configured to inhibit the execution of the particular processing after the self-deselection resulting from the detection of a conflict.

An exemplary embodiment is schematically illustrated in the figure. It is assumed here that the processing circuitry MTR comprises a first input E1 intended to receive the signal CS. The inhibition circuitry MH, for example an appropriate logic, then receives, on a second input E2, the output signal of the inverter INV5. This output signal of the inverter is at "0" in the presence of a detected conflict. In this case, the logic MH, receiving a 0 logic signal, will inhibit the operation of the processing circuitry MTR.

The invention is not limited to the implementations and embodiments which have just been described, but encompasses all variants. Thus, although a conflict that can be detected on the data line SDA has been described, it is perfectly possible for a conflict to occur on the clock line SCL, particularly when the interface INT comprises another transistor TR connected to the line SCL as is provided in certain particular cases in the I²C specification ("clock stretching").

Moreover, what has just been described for an I²C bus applies generally to any bus with at least two wires with a priority logic level, for example the SM bus.

The characteristics of the SM bus and of the SM bus protocol are well known to the person skilled in the art. The latter will be able, for all useful purposes, to refer in particular to the document that is particularly available on the Internet, entitled "System Management Bus (SMBus) Specification, version 2.0, 3 Aug. 2000".

What is claimed is:

1. A method for managing the operation of a slave circuit operating in a slave mode, the circuit connected to a bus having a plurality of wires and being configured to impose a plurality of logic levels on the bus, wherein a priority logic level of the plurality of logic levels is selected to be imposed at a given time, the method comprising:
   imposing, by the slave circuit, the priority logic level on a first wire of the bus;
   while imposing, detecting, by the slave circuit, a possible conflict on the first wire resulting from a forcing, external to the slave circuit, of the first wire to an other logic level, wherein the other logic level comprises a voltage that does not correspond to a logic level of the plurality of logic levels, and detecting the conflict comprises detecting, by the slave circuit, that the voltage of the other logic level is greater than the priority logic level being imposed by the slave circuit; and
   upon detecting a conflict, placing the slave circuit in a state stopping, wherein the slave circuit listens to the bus but does not send any data over the bus in the stopping state.

2. The method according to claim 1, wherein the circuit is connected to an I2C bus that is compliant with an I²C bus protocol or to an SM bus that is compliant with an SM bus protocol.

3. The method according to claim 2, wherein placing the slave circuit in the stopping state comprises generating an internal signal within the slave circuit, the internal signal being interpreted by the slave circuit as representative of receiving a STOP condition of the I2C bus protocol or of the SM bus protocol.

4. The method according to claim 3, wherein the slave circuit is configured to execute at least one particular processing after receiving the STOP condition, the method further comprising inhibiting execution of the at least one particular processing after generating the internal signal.

5. The method according to claim 4, wherein the slave circuit comprises a memory.

6. The method according to claim 5, wherein the slave circuit comprises an EEPROM.

7. The method according to claim 6, wherein the particular processing comprises programming of the memory.

8. The method according to claim 3, further comprising:
detecting reception of the STOP condition;
delivering a deselect signal within the circuit in response to detecting the STOP condition; and
delivering the deselect signal within the circuit in response to generating the internal signal.

9. The method according to claim 1, wherein the detecting comprises:
comparing a voltage of the first wire on which the slave circuit imposes the priority logic level with a reference voltage; and
detecting the conflict when the voltage exceeds the reference voltage for a predetermined duration, wherein the slave circuit comprises a timer that is configured to detect a conflict in response to a possible conflict being detected by a detector for a preset period of time.

10. The method according to claim 1, wherein the bus comprises a data wire and a clock wire and the slave circuit imposes the priority logic level on the data wire of the bus on a falling edge of a clock signal on the clock wire.

11. The method according to claim 10, wherein the detecting comprises comparing a voltage of the data wire with a reference voltage and detecting the conflict when the voltage exceeds the reference voltage on a rising edge of the clock signal following the falling edge.

12. The method according to claim 1, wherein the slave circuit imposes the priority logic level via a transistor, the method further comprising limiting a voltage applied to a control electrode of the transistor.

13. A circuit, comprising:
an interface configured to be connected to a bus in a slave mode, the bus having a plurality of wires and a priority logic level, the interface further configured to exchange data over the bus;
a driver configured to impose the priority logic level on a first wire of the bus;
a detector configured to detect a possible conflict on the first wire resulting from a forcing, external to the circuit, of the first wire to a different logic level;
a timer, coupled to the detector, the timer being configured to detect a conflict in response to the possible conflict being detected by the detector for a preset period of time, and being configured to not detect a conflict in response to the possible conflict that is detected by the detector ending before expiration of the preset period of time; and
a control circuit configured to, in response to detection of a conflict, place the circuit in a state that stops the circuit from sending any data over the bus while leaving the circuit listening to the bus.

14. The circuit according to claim 13, wherein the interface is configured to be connected to an I2C bus protocol or to an SM bus that is compliant with an SM bus protocol.

15. The circuit according to claim 14, wherein the control circuit comprises a signal generation circuit configured to, in response to the detection of the conflict, generate an internal signal that can be interpreted by the circuit as representative of receiving a STOP condition of the I2C bus protocol or of the SM bus protocol.

16. The circuit according to claim 15, further comprising a processor configured to execute at least one particular processing after reception of the STOP condition and also configured to inhibit execution of the at least one particular processing after the generation of the internal signal.

17. The circuit according to claim 16, wherein the circuit is a slave circuit comprising a EEPROM-type memory and wherein the processor comprises memory programming circuitry.

18. The circuit according to claim 16, wherein the interface comprises a detection block configured to detect the STOP condition configured to deliver a deselect signal in response to the detection of the STOP condition, and the control circuit comprises a logic gate coupled to an output of the signal generation circuit and to an output of the detection block, the control circuit configured to deliver a deselect signal in response to the internal signal.

19. The circuit according to claim 13, wherein the circuit is a slave circuit comprising a EEPROM-type memory.

20. The circuit according to claim 13, wherein the detector comprises a comparator configured to perform a comparison of a voltage of the first wire with a reference voltage.

21. The circuit according to claim 13, wherein:
the driver is configured to impose, in a first state, the priority logic level on a data wire of the bus on a falling edge of a clock signal;
the detector comprises a comparator configured to perform a comparison of a voltage of the data wire with a reference voltage and an edge detector configured to detect a rising edge of the clock signal following the falling edge; and
the control circuit is coupled to an output of the comparator and to an output of the edge detector and is configured to place the circuit in the state when the voltage exceeds the reference voltage on the rising edge of the clock signal following the falling edge.

22. The circuit according to claim 13, wherein the driver comprises a transistor and a voltage limiting circuit configured to limit a voltage applied to a control electrode of the transistor.

23. A circuit, comprising:
an interface configured to be connected to a bus in a slave mode, the bus having a plurality of wires and a priority logic level, the interface further configured to exchange data over the bus;
means for imposing the priority logic level on one of the wires of the bus in a first state;
detecting means for detecting a possible conflict on the one of the wires resulting, when the means for imposing is in the first state, from a forcing, external to the circuit, of the one of the wires to another logic level, wherein the detecting means comprises means for comparing a voltage of the one of the wires with a reference voltage and outputs a result of the comparing to a logic gate; and
means for placing the circuit in a stopping state in response to a detected conflict state, wherein, in the stopping state, the circuit stops sending any data over the bus and listens to the bus.

24. The circuit according to claim 23, wherein the detecting means further comprises an inverter, wherein the inverter comprises a transistor of a first size and a transistor of a second size, and wherein the first size is bigger than the second size.

* * * * *

UNITED STATES PATENT AND TRADEMARK OFFICE
CERTIFICATE OF CORRECTION

PATENT NO. : 9,489,334 B2
APPLICATION NO. : 14/042344
DATED : November 8, 2016
INVENTOR(S) : Tailliet Page 1 of 1

It is certified that error appears in the above-identified patent and that said Letters Patent is hereby corrected as shown below:

In Column 10, Line 59, Claim 2, delete "I2C" and insert -- $I^2C$ --.

In Column 10, Line 66, Claim 3, delete "I2C" and insert -- $I^2C$ --.

In Column 11, Line 61, Claim 14, delete "I2C" and insert -- $I^2C$ --.

In Column 12, Line 2, Claim 15, delete "I2C" and insert -- $I^2C$ --.

Signed and Sealed this
Tenth Day of July, 2018

Andrei Iancu
*Director of the United States Patent and Trademark Office*